United States Patent [19]

Ramshaw

[11] Patent Number: 4,715,869
[45] Date of Patent: Dec. 29, 1987

[54] DEGASSING OF LIQUIDS

[75] Inventor: Colin Ramshaw, Warrington, England

[73] Assignee: Imperial Chemical Industries PLC, London, United Kingdom

[21] Appl. No.: 843,371

[22] Filed: Mar. 24, 1986

[30] Foreign Application Priority Data

Apr. 3, 1985 [GB] United Kingdom ................ 8508690

[51] Int. Cl.$^4$ ............................................. B01D 19/00
[52] U.S. Cl. ......................................... 55/53; 55/196; 55/233; 261/89
[58] Field of Search ..................... 55/53, 54, 159, 196, 55/198, 203, 233, 404, 405; 261/89

[56] References Cited

U.S. PATENT DOCUMENTS 4,283,255 8/1981 Ramshaw et al. ................... 261/89

FOREIGN PATENT DOCUMENTS 1193204 10/1985 Canada .................................... 55/54
1072869 6/1967 United Kingdom .

Primary Examiner—Bernard Nozick
Attorney, Agent, or Firm—Cushman, Darby & Cushman

[57] ABSTRACT

A rotary device comprising a rotor which comprises (i) a first annular compartment in which is disposed a permeable element, and (ii) a second annular compartment and which is adapted such that a liquid to be degassed flows radially outwards, in counter-current flow to a displacing gas, as a continuous phase, through the pores of the permeable element and then radially inwards through the second compartment to be discharged from the rotor adjacent the axis of rotation thereof. The device is particularly suitable for the deaeration of water.

15 Claims, 1 Drawing Figure

DEGASSING OF LIQUIDS

BACKGROUND OF THE INVENTION

This invention relates to a process for removing a gas from a liquid in which it is sparingly soluble, particularly to such a process for deaerating water, when carried out in a rotary device and to a rotary device for use therein.

For many industrial purposes, water is required to be as free as possible of dissolved oxygen. For others, while dissolved oxygen cannot be tolerated, another dissolved gas, such as methane, nitrogen or carbon dioxide, is acceptable.

For example, where water is required to be used as feed to a boiler, all dissolved gases are normally removed therefrom. Oxygen and carbon dioxide present in boiler feed-water tend to give rise to corrosion of the boiler and inert gases such as nitrogen are usually conveniently removed at the same time as the undesirable dissolved gases.

To give another example, where water is used for injection into oil-bearing formations to enhance production of oil from wells bored therein, it is necessary that oxygen by absent from the water, as otherwise bacterial growth in the pores of the formations is often encouraged and the pores may become blocked and oil displacement inhibited. However other gases, for example gaseous hydrocarbons, can be readily tolerated in such injection water.

For all these purposes, oxygen and/or other undesirable dissolved gases have to be removed from water. To achieve this removal, a range of designs of so-called "deaerators" or "degassifiers" have been developed. These devices are static devices in which either the water is exposed to reduced pressure or a displacing gas is passed through the water at atmospheric, reduced or elevated pressure.

The large volumes of water which are treated in these ways entail large vessels and ancillary equipment and represent considerable investment of capital. There is therefore a great incentive to devise ways of reducing the size of the vessels employed. In addition, where the water treatment is to be carried out off-shore, for example in operating boiler feed-water for ships or in deaerating injection water for off-shore wells, any way of reducing the volume and/or weight of the treatment unit is a highly desirable end.

In our published European Patent Specification No 0,089,128A we describe a process for displacing dissolved gas from water in which process the water flows as a thin film through a continuous gas phase, in a high surface area rotor rotating at such a speed as to subject the water to an acceleration, expressed in a direction radial with respect to the axis of rotation, which is greater than the acceleration due to gravity. The thin film is continuously being split, i.e, it tends to form water droplets, such that the mean fluid density is closer to the density of the gas than the density of water.

We have now devised a modified process and device in which for the removal of a gas from unit mass of liquid in unit time a rotor of significantly smaller diameter can be used and at least a fivefold reduction in power consumption may be obtained compared with the rotor and process described in our aforesaid European patent specification.

SUMMARY OF THE INVENTION

According to the present invention there is provided a process for the removal of a gas from a liquid in which it is sparingly soluble which process comprises the counter-current contacting of the liquid with a displacing gas in the pores of a permeable element disposed in a rotor rotating at such a speed that the liquid is subjected to an acceleration, expressed in a direction radial with respect to the axis of rotation, which is greater than the acceleration due to gravity as it flows radially outward through the pores characterised in that the liquid is the continuous phase and bubbles of the displacing gas form the dispersed phase in the said pores and that the liquid discharged from the radially outer region of the permeable element is diverted such that it is discharged from the rotor at the radially inner region thereof.

The liquid to be treated in the process according to the present invention can be organic or preferably inorganic.

Preferably the liquid which is treated in the process according to the first aspect of the present invention is water and the sparingly soluble gas is air or oxygen.

The sparingly soluble gas may be any gas which does not react chemically with the liquid. As sparingly soluble gases for water may be mentioned inter alia oxygen, hydrogen or nitrogen.

According to a further aspect of the present invention there is provided a rotary device comprising (a) a rotor which comprises: a first annular compartment which is disposed coaxially about the axis of rotation of the rotor; a permeable element which is disposed in the first annular compartment and through the pores of which water flows radially outward as a continuous phase; a second annular compartment through which the water flows radially inward which (i) is disposed coaxially about the said axis, adjacent the first annular compartment, (ii) has an internal radius which is bigger than the internal radius of the first annular compartment and (iii) is in liquid flow connection with the first annular compartment via the radially outer regions of both compartments;

(b) means to charge water to be deaerated to the radially inner region of the first annular compartment;

(c) means to charge a displacing gas to the radially outer region of the first annular compartment; and (d) means to collect water discharged from the radially inner region of the second annular compartment.

Preferably there is provided in the second annular compartment means to contact the diverted water, absorb at least a substantial portion of the kinetic energy thereof before it is discharged from the rotor and transfer the said portion to the rotor to facilitate rotation thereof. Conveniently the aforesaid means is in the form of a plurality of vanes disposed on a surface of the second annular compartment, preferably such vanes are disposed on a member which separates the first annular compartment from the second annular compartment.

The displacing gas used in the present invention is any gas which the liquid to be treated can tolerate as a dissolved species. Within the term "gas" we include vapours, e.g. steam.

The manner in which the process of the present invention is operated depends upon the specific requirement of each application in which it is carried out. More specifically, it depends upon the nature of the water available, the characteristics required of the water produced and the availability of a displacing gas to displace the dissolved oxygen. For example, if the product water is to be used to feed a boiler, especially a boiler operating at high pressure, then it is necessary to remove all gases down to very low concentrations. Thus, a typical water feed to a high-pressure boiler might be required to have an oxygen concentration as low as 0.007 parts per million (ppm). To achieve oxygen levels as low as this, while simultaneously displacing dissolved nitrogen and any dissolved carbon dioxide, a highly suitable displacing gas is steam. Since one effect of displacing dissolved gas from water with steam is to raise the temperature of the water, the use of steam as the deaerating vapour is of particular value for boiler feedstocks, as the water would in any case require to be heated for this latter purpose.

In preparing water for injection into oil wells, the displacing of other gases than oxygen is not important. Thus it is possible and very convenient to employ as the displacing gas any gaseous product which is co-produced with the oil. In practice, this may be a gaseous hydrocarbon such as methane and/or ethane, or in appropriate situations carbon dioxide or nitrogen. When the oil well is an on-shore well, the feed-water is likely to be raw river water or mains water from some similar fresh-water source or possibly water produced from a well drilled specifically for the purpose. On shore, the displacing gas may be natural gas from the well itself, or co-produced nitrogen and/or carbon dioxide, or nitrogen and/or carbon dioxide produced or imported specifically for injection purposes. With an off-shore well, the most convenient source of water for injection is sea-water and the most convenient displacing gas will be a gaseous stream from the well, if available, especially co-produced natural hydrocarbon gas. If desired, the water after deaeration may be mixed with water co-produced in the well before it is injected into the oil-bearing formation although in general it is preferred not to inject co-produced water since such water normally requires some form of treatment, e.g. fine filtration, before it is suitable for use in this way.

With conventional deaeration of water, an oxygen scavenger is often added to the deaerated water or to the water during deaeration in order to remove as much as possible of the residual oxygen. Thus sea-water which initially contained a few ppm of oxygen, say 10 ppm, and which has been conventionally deaerated to a value of say 0.05 ppm, may be treated with an oxygen scavenger in order to lower further the oxygen concentration. It is believed that, using the process of the present invention, it may well be economical to deaerate by physical methods to an oxygen concentration level which is already acceptable, thus avoiding the need of a chemical scavenger in many situations. It will be appreciated that to obtain such low levels of oxygen concentration it may be necessary to use a permeable element of greater radial depth.

The permeable element which is disposed in the aforesaid first annular compartment allows the flow of water and gas therethrough under the conditions of operation of the device according to the second aspect of the present invention and has the capacity to split gas bubbles flowing therethrough. Preferably it has a voidage of at least 80%. Typically it is formed from fine gauge fibres, filaments or strands. It may be of unitary construction or assembled, if desired in situ, from a plurality of parts or layers. Thus the element may be of knitted or woven cloth, for example metal cloth; a crumpled mesh; a random or ordered mat or other mass of fibres, for example metallic fibres, which may if desired be strengthened by sintering or adhesive bonding; a sintered mass of metal particles; or a reticulated foam, e.g. of a metal or preferably plastic; reticulate plastic foam tends to have a density similar to that of water hence the forces generated in the rotor are smaller. Specific examples of suitable materials include knitted metal cloth, for example that sold under the trade mark "Knitmesh", which may for example be wound in layers about a support which surrounds or is located at the axis of rotation of the rotor, and metallic skeletal foams, for example the product sold under the trade mark "Retimet", which may conveniently be assembled in layers to form the permeable element.

Preferably the permeable element is in the form of an annulus which is disposed coaxially in the first annular compartment since such a disposition helps to keep the rotor in balance in use. Typically the permeable element is disposed throughout the first annular compartment.

Typically the rate of flow of the water, measured as volume per unit time, is at least about ten times the rate of flow of the displacing gas, which leads to valuable savings in energy.

It will be appreciated that the pressure at which the gas has to be charged to the outer region of the permeable element will depend on inter alia the outer radius of the first annular compartment and the speed at which the rotor is rotated. For example, for a first annular compartment of outer radius 0.25 meters disposed in a rotor rotating at 1000 rpm the gas is typically charged at a pressure of about $2 \times 10^5 Nm^{-2}$.

Typically the axial length of the first annular compartment is between 1.5 and 2 times the axial length of the second annular compartment. However, the aforesaid ratio is not critical and ratios outside the aforementioned values may be used.

Preferably the inner radius of the first annular compartment is between 75% and 95% of the inner radius of the second annular compartment. However, we do not exclude the possibility that ratios outside the aforementioned range of ratios may be used.

Since the radial acceleration to which the solution is subjected varies with the distance from the axis of rotation, it is convenient to refer to the mean acceleration $(a_m)$, which is defined by the equation:

$$a_m = \left(\frac{2\pi N}{60}\right)^2 \times \left(\frac{r_0^2 + r_1^2}{2}\right)^{\frac{1}{2}}$$

where N is the rotational speed of the motor in revolutions per minute, $r_0$ is the distance from the axis of the radially innermost part of the first annular compartment and $r_1$ is the distance from the axis of the radially outermost part of said compartment. The mean accleration to which the water is subjected is preferably at least 300 m sec$^{-2}$, especially at least 1,000 m sec$^{-2}$, and may advantageously be as high as 10,000 m sec$^{-2}$ or higher. Thus, in terms of the acceleration due to gravity (g), the mean acceleration may amount to 30 g or 100 g or 1,000 g or more.

The rotational speed at which it is necessary to rotate the rotor in order to achieve acceleration values which are a multiple of that due to gravity is, as is clear from the above equation, dependent only upon rotor dimensions and upon the degree of acceleration selected. Thus with a rotor having an inner radius of 0.15 m and an outer radius of 0.25 m, if it is desired to subject the water to a mean radial acceleration of 700 m sec$^{-2}$, it is necessary to rotate the rotor at about 550 revs/min. If the acceleration is to be about 1,000 m sec$^{-2}$, then the rotational speed must be of the order of 650 revs/min. In general, it is likely that the rotational speed of the rotor employed in the process of the present invention will lie between 50 and 10,000 revs/min, for example between 100 and 5,000 revs/min and preferably between 500 and 2,000 revs/min.

The rotor is constructed of any material which combines the characteristics of mechanical strength and corrosion resistance required by the intended conditions of use. Thus for treatment of fresh water, the required characteristics may be met by the use of one of the stainless steels conventionally used in static deaeration equipment. For sea-water deaeration, one of the copper-based marine alloys, for example an admiralty alloy or a cupro-nickel alloy, may be used. Also for sea-water, titanium metal is very suitable, as is an alloy of nickel and chromium. In some conditions of use, especially where long exposures to still sea-water are not contemplated, some of the stainless steels, such as the 316 type containing chromium, nickel and molybdenum, are suitable.

BRIEF DESCRIPTION OF DRAWING

The invention will be further described by reference to the accompanying drawing which shows, by way of example only, one embodiment of a device for use in the present invention.

The Figure illustrates, in vertical section one form of device according to the second aspect of the present invention.

DESCRIPTION OF PREFERRED EMBODIMENT

Figure 1:
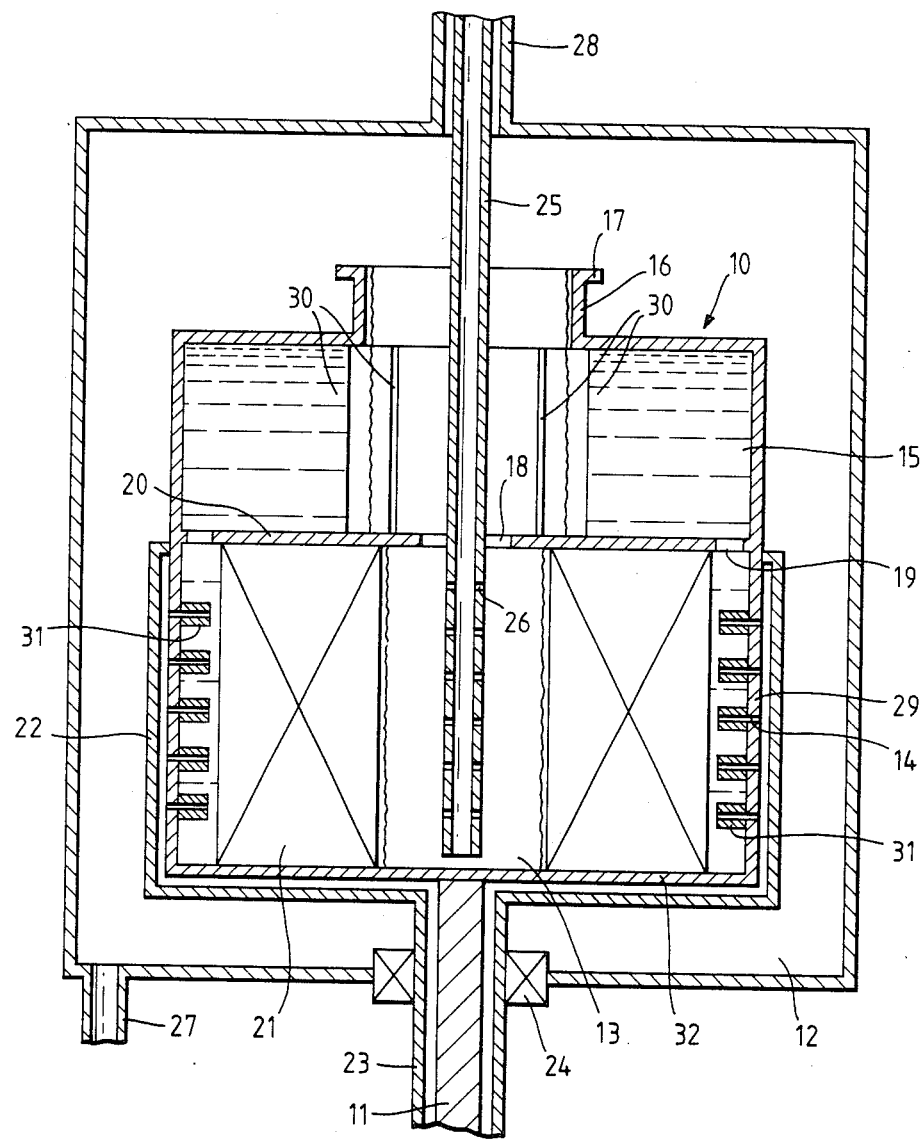

In the Figure, a rotor 10 is mounted upon a shaft 11 by means of which it is rotated in chamber 12. The rotor comprises a first annular compartment 13, provided with ports 14 in its outer wall 29, and a second annular compartment 15 which is provided with a collar 16, lip 17 and vanes 30 disposed on plate 20, which first and second annular compartments are in gas flow communication via port 18 and liquid flow communication via a plurality of ports 19 adjacent the outer perimeter of plate 20. In the first annular compartment there is disposed an annular permeable element 21, held in place by retaining means (not shown) and assembled from concentric layers of reticulate plastic foam. A plurality of gas feed pipes 22 are mounted on the wall 29 and on the base 32 of the first annular compartment which pipes 22 feed gas from the inlet pipe 23, disposed coaxially about shaft 11 and rotatable therewith via bearings 24, to ports 14 and injection tubes 31 which are disposed adjacent the radially outer surface of the permeable element 21. A water inlet tube 25 provided, in its lower part, with a plurality of ports 26, projects into the first annular compartment 13. A water outlet tube 27 and a gas outlet tube 28 allow the discharge of water and gas respectively from the chamber 12.

In operation, oxygen-containing water is charged via water inlet tube 25 and ports 26 to the radially inner face of the permeable element 21, which is rotating with the annular compartment 13, at such a rate that it forms a continuous phase in the annular compartment. The water flows generally radially outwards through the pores of the permeable element 21 where it is subjected to a mean centrifugal acceleration of approximately 50 times the acceleration due to gravity and where it contacts a displacing gas, e.g. a mixture of methane and ethane. The deaerated water leaves the radially outer face of the permeable element and then flows through the plurality of ports 19 into the second annular compartment 15. In compartment 15, the water loses a substantial portion of its kinetic energy to vanes 30 which use it to help rotate the rotor. When the compartment 15 is full of water the water overflows and is discharged from the rotor 10 into the chamber 12 at lip 17. The deaerated water is withdrawn from the chamber 12 through port 27.

The aforementioned gas mixture is introduced to the first annular compartment 13 via gas feed pipes 22 and 23 ports 14 and injection tubes 31 under sufficient pressure to cause it to enter the permeable element 21. The gas flows, as a stream of bubbles, in a generally inward direction through the pores of the permeable element 21, counter-current to the flow of water. Within the permeable element, the bubbles are continually split by the strands of the permeable element. Within the pores, the gas/water contact takes place by means of which oxygen is transferred from the water to the gas phase. The gas emerges from the inner face of the permeable element 21, it flows out of the first annular compartment through port 18 and is removed via gas discharge pipe 28.

The present invention is further illustrated by reference to the following Examples.

EXAMPLE 1

This Example illustrates the reduction in power consumption which can be obtained by use of the device according to the present invention.

In the first annular compartment of a rotary device as illustrated in the Figure, which rotary device had an axial length of 0.5 meters and a radius of 0.4 meters, was disposed an annular permeable element of internal radius 0.15 meters, external radius 0.25 meters, and axial length 0.30 meters made from 100 Grade reticulate plastic foam; the internal radius of the second compartment was 0.18 meters. The rotor was rotated at 1000 rpm while oxygen-containing water was charged at 204 m$^3$/hour to the radially inner face of the permeable element and nitrogen, at $6.3 \times 10^{-3}$ standard m$^3$/sec was charged to the radially outer face of the first annular compartment. From the concentration of oxygen in the water charged to the rotor and the concentration of oxygen in the water discharged from the rotor it was calculated that the total work done (i.e. power to compress the nitrogen, plus work done to accelerate the liquid) was 8.5 kw.

In a comparative test, using the rotary mass transfer device illustrated in European Patent Specification No. 89,128, it was found that the work done for a similar decrease in oxygen concentration was 50 kw.

EXAMPLE 2

This Example illustrates the small size of water bubbles which can be obtained in the process of the present invention. It is believed that this small size contributes to the good mass transfer coefficients which are obtainable in such a process.

In a device as illustrated in the Figure we have found that we can obtain bubbles of water of the following sizes (mm diameter) under the following conditions for air/water systems.

| | Bubble Size: Mean Diameter (mms) | | | | | | | | |
|---|---|---|---|---|---|---|---|---|---|
| | 100 Grade Foam | | | 60 Grade Foam | | | 45 Grade Foam | | |
| RPM | A | B | C | C | A | B | B | C | A |
| 1500 | .24 | .26 | .30 | .26 | .26 | .32 | .32 | .35 | .36 |
| 100 | .29 | .32 | .39 | .35 | .38 | .47 | .49 | .55 | .41 |
| 500 | .63 | .62 | .98 | .71 | .77 | .68 | .68 | .78 | .47 |

A: Air Flow 60 ml/min
B: Air Flow 100 ml/min
C: Air Flow 20 ml/min

I claim:

1. A process for the removal of a gas from a liquid in which it is sparingly soluble which comprises:
   providing a rotor which includes a first annular chamber and a second superposed annular chamber, both having radially inner and outer regions, the first chamber including a permeable element having radially inner and outer regions;
   feeding liquid to be processed into the radially inner region of said first chamber and rotating said rotor so that the liquid in said first chamber is subjected to an acceleration, expressed in a radial direction with respect to the axis of rotation, which is greater than the acceleration due to gravity whereby the liquid flows outwardly from the inner region of said element through the pores of said element to the outer region thereof;
   feeding a displacing gas from the radially outer region of said element through the element while preventing liquid from leaving the radially outer region so that the displacing gas and liquid are in counter-current contact in the pores of said permeable element whereby gas in the liquid is removed by said displacing gas;
   maintaining the liquid as the continuous phase and bubbles of the displacing gas in the dispersed phase;
   collecting the liquid as it is discharged from he radially outer region of the permeable element;
   passing the thus processed liquid into the second chamber through port means communicating between the radially outer regions of said first and second chambers;
   discharging the liquid from said second chamber at a radially inner region thereof; and
   collecting the displacing gas and the removed gas inwardly from treated liquid.

2. A process as claimed in claim 1 wherein the rate of flow of liquid, measured as volume per unit time, is at least about ten times the rate of flow of the gas.

3. A process as claimed in claim 1 for the deaeration of water.

4. A process as claimed in claim 3 wherein the displacing gas is steam, a gaseous hydrocarbon, carbon dioxide or nitrogen.

5. A process as claimed in claim 3 wherein the mean acceleration to which the water is subjected is at least 300 meters seconds$^{-2}$.

6. A process as claimed in claim 3 wherein the water is obtained from a natural source.

7. A process as claimed in claim 6 wherein the source is a river, well or sea.

8. A device which is suitable for deaerating water comprising:
   a fixed housing;
   a rotor within said housing, said rotor comprising;
   (a) a first annular compartment disposed coaxially about the axis of rotation of the rotor, said compartment having radially inner and outer regions;
   (b) a permeable element disposed in said first annular compartment between said inner and outer regions, the pores of said element being such that water charged to said first annular compartment can be caused to flow radially outwardly as a continuous phase from the inner region of said compartment through said permeable element to the outer region of said compartment;
   (c) a second annular compartment superposed on the first compartment through which water discharged from said first compartment flows radially inwardly, said compartment being disposed coaxially about the said axis and having radially inner and outer regions; said second compartment being positioned adjacent the first annular compartment and being in liquid flow connection with the first annular compartment and being in liquid flow connection with the first annular compartment via the radially outer regions of both compartments;
   (d) means to charge water to be deaerated to the radially inner region of said first annular compartment for flow through said permeable element;
   (e) further means to charge displacing gas to the radially outer region of said first annular compartment and to prevent water from leaving the radially outer region, wherein said gas passes radially inwardly through said permeable element in counter-current flow and contact with the water to be deaerated;
   (f) port means for directing the water after its passage through the permeable element to the outer region of said second compartment; and
   (g) means for discharging the water in said second compartment from the radially inner region of said second compartment into said housing;
   means for discharging the thus discharged water from said housing;
   means for discharging used gas from said second compartment of the rotor inwardly of the liquid from said housing; and
   means for rotating said rotor so that water charged to said first annular compartment will flow radially outwardly through said permeable element for counter-current contact with said displacing gas.

9. A rotary device as claimed in claim 8 wherein the second annular compartment contains means to contact the diverted water and to divert a substantial portion of its kinetic energy to facilitate rotation of the rotor.

10. A rotary device as claimed in claim 8 wherein the permeable element has a voltage of at least 80%.

11. A rotary device as claimed in claim 8 wherein the permeable element is formed from fine gauge fibres, filaments or strands.

12. A rotary device as claimed in claim 8 wherein the permeable element is formed from plastic reticulate foam.

13. A rotary device as claimed in claim 8 wherein the inner radius of the first annular compartment is between 75% and 95% of the inner radius of the second compartment.

14. A rotary device as claimed in claim 8 wherein the permeable element is in the form of an annulus which is disposed coaxially in the first annular compartment.

15. A device as claimed in claim 8, further comprising a plurality of axial vanes, disposed in said second annular compartment, for conserving kinetic energy imparted to said water in said first annular compartment.

* * * * *